United States Patent
Ross et al.

(10) Patent No.: US 9,970,523 B2
(45) Date of Patent: May 15, 2018

(54) TORQUE CONVERTER AND A METHOD FOR COOLING A CLUTCH ASSEMBLY OF THE TORQUE CONVERTER

(71) Applicant: Caterpillar Inc., Peoria, IL (US)

(72) Inventors: Valerie Annette Ross, Peoria, IL (US); Xuekui Lan, Peoria, IL (US); Jim Wu, Portland, OR (US); Qinyang Rao, Washington, IL (US); Timothy M. Waters, Peoria, IL (US); Weixue Tian, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 203 days.

(21) Appl. No.: 14/838,448

(22) Filed: Aug. 28, 2015

(65) Prior Publication Data
US 2017/0059022 A1    Mar. 2, 2017

(51) Int. Cl.
| F16D 41/30 | (2006.01) |
| F16H 45/02 | (2006.01) |
| F16H 41/04 | (2006.01) |
| F16H 41/30 | (2006.01) |
| F16D 33/20 | (2006.01) |

(52) U.S. Cl.
CPC ............. *F16H 45/02* (2013.01); *F16H 41/04* (2013.01); *F16H 41/30* (2013.01); *F16D 33/20* (2013.01); *F16H 2045/0215* (2013.01); *F16H 2045/0284* (2013.01)

(58) Field of Classification Search
CPC ........... F16D 33/20; F16H 41/04; F16H 41/30
See application file for complete search history.

(56) References Cited

U.S. PATENT DOCUMENTS

| 3,023,582 A * | 3/1962 | Ryan ...................... F16D 33/20 60/338 |
| 6,116,024 A * | 9/2000 | Rottino .................. F16D 41/12 192/46 |
| 7,264,101 B2 | 9/2007 | Hauck et al. |
| 2011/0000204 A1* | 1/2011 | Lecocq .................. F16H 41/04 60/330 |
| 2013/0081916 A1* | 4/2013 | Waters .................... F16H 45/02 192/3.25 |
| 2013/0255242 A1* | 10/2013 | Walker .................... F16H 41/28 60/364 |
| 2013/0283774 A1* | 10/2013 | Walker .................. F16J 15/006 60/364 |
| 2014/0166426 A1 | 6/2014 | Kuhnle et al. |
| 2014/0174876 A1 | 6/2014 | Meyer et al. |

FOREIGN PATENT DOCUMENTS

DE    102013202283    8/2014

* cited by examiner

*Primary Examiner* — Ramya Burgess
*Assistant Examiner* — Lillian Nguyen
(74) *Attorney, Agent, or Firm* — Jeff A. Greene

(57) ABSTRACT

A torque converter includes a housing, and an impeller shell disposed within the housing. The impeller shell has a back wall, and a plurality of fins radially arranged and extending outwardly from the back wall. The torque converter further includes a backing hub rigidly coupled to the back wall of the impeller shell. The backing hub has a barrier element extending therefrom. A free end of the barrier element is disposed proximal to the housing to restrict a flow of fluid therebetween.

20 Claims, 5 Drawing Sheets

TORQUE CONVERTER AND A METHOD FOR COOLING A CLUTCH ASSEMBLY OF THE TORQUE CONVERTER

TECHNICAL FIELD

The present disclosure relates to a torque converter. More particularly, the present disclosure relates to a torque converter having capabilities for cooling a clutch assembly present therein.

BACKGROUND

Earth moving machines have long been known to employ torque converters to co-operate with their engines. These torque converters typically contain impeller clutches having several sets of clutch plates and/or friction plates therein. These impeller clutches are typically configured for accomplishing a selective engagement between an impeller and a turbine present in the torque converter. However, these impeller clutches also have a propensity for heating up during operation i.e., when engaging and disengaging the impeller from the turbine numerous times during operation of the machine. Although various parts of the torque converter including the impeller clutch may dissipate heat through a natural process of convection via a body of the torque converter, fluctuations in the rate of heat convection can nevertheless still impact an amount of cooling to the impeller clutch. Over a period of time and upon prolonged use, the impeller clutch may be subject to premature wear and tear, and may even fail to operate as it would normally.

U.S Publication 2014/0174876 discloses a torque converter clutch cooling system that includes a clutch housing defined between a drive hub of a drive member and a clutch hub of a driven member and a clutch assembly housed in the clutch housing. The clutch hub includes a hub deck having a plurality of bores therethrough, an inner annulus extending axially from the hub deck, and an outer annulus extending axially from the hub deck, the outer annulus including a plurality of radial orifices therethrough and a lip flange extending from a distal end towards the inner annulus. The clutch assembly includes a plurality of clutch plates secured to the drive hub and a plurality of friction plates secured to the driven member. A piston assembly is provided for engaging or disengaging the plurality of friction plates against the plurality of clutch plates to cause or release integrated rotation of the drive member and the driven member.

However, manufacturers of torque converters are continuing to develop newer ways and/or strategies for cooling impeller clutches associated with torque converters.

SUMMARY OF THE DISCLOSURE

In one aspect of the present disclosure, a torque converter includes a housing, and an impeller shell disposed within the housing. The impeller shell has a back wall, and a plurality of fins radially arranged and extending outwardly from the back wall. The torque converter further includes a backing hub rigidly coupled to the back wall of the impeller shell. The backing hub has a barrier element extending therefrom. A free end of the barrier element is disposed proximal to the housing to restrict a flow of fluid therebetween.

In another aspect of the present disclosure, a torque converter includes a housing. The housing includes a first portion disposed adjacent to an impeller shell, the impeller shell being disposed at least in part within the first portion of the housing, wherein the impeller shell has a back wall, and a plurality of fins radially arranged and extending outwardly from the back wall. The housing further includes a second portion spaced apart from the first portion, and a third portion disposed between and rigidly coupled to the first and second portions.

The torque converter further includes a backing hub rigidly coupled to the back wall of the impeller shell. The backing hub includes a barrier element extending outwardly from the backing hub such that a free end of the bather element is disposed proximal to an inner surface of the third portion of the housing. The backing hub further includes a ledge member laterally extending partway towards the second portion of the housing, wherein the ledge member, the second portion of the housing, and the third portion of the housing are configured to mutually define a first outer pocket. The torque converter further includes a clutch assembly disposed in the first outer pocket, wherein the barrier element is configured to maintain an increased mass flow rate of fluid to the clutch assembly.

In yet another aspect of the present disclosure, a method for cooling a clutch assembly of a torque converter having a housing and an impeller shell disposed within the housing. The method includes defining a plurality of radially outward fins to extend from a back wall of the impeller shell; coupling a backing hub to the back wall of the impeller shell; and positioning a barrier element between the impeller shell, the housing, and the backing hub such that the bather element is configured to restrict a flow of fluid therebetween.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
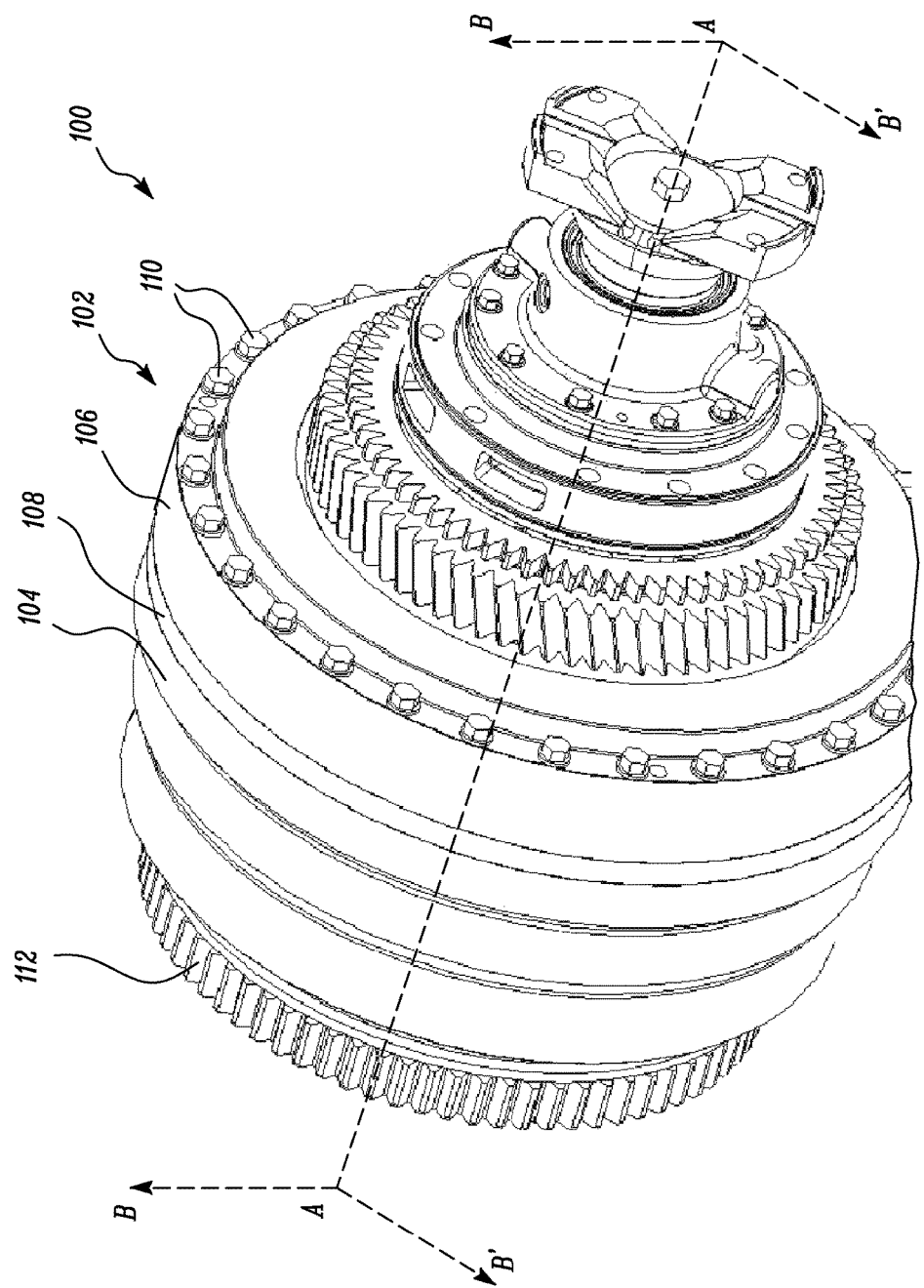
FIG. 1 is an assembled view of a torque converter, in accordance with embodiments of the present disclosure.

FIG. 1 illustrates a torque converter 100, in accordance with embodiments of the present disclosure. The torque converter 100 disclosed herein may be used in mobile machines for e.g., wheeled vehicles that are typically employed in various applications including, but not limited to, mining, quarrying, road construction, site preparation, etc. For example, the machine may be embodied in the form of a wheel loader employed for hauling earth materials such as soil, debris, logs, or other naturally occurring deposits from a worksite. Although a wheel loader is disclosed herein, other types of mobile machines such as, but not limited to, mining truck, off-highway trucks, articulated trucks, on-highway trucks, or the like may be employed in lieu of the wheel loader.

In alternative embodiments of the present disclosure, the machine can optionally be embodied in the form of a manually operated machine, an autonomous machine, or a machine that is operable in both manual and autonomous mode. Therefore, notwithstanding any particular type or configuration of machine disclosed in this document, it will be appreciated by one skilled in the art that systems and methods disclosed herein can be similarly applied to numerous other types of machines known in the art without deviating from the spirit of the present disclosure.

Referring to FIG. 1, the torque converter 100 includes a housing 102. The housing 102 includes a first portion 104, a second portion 106, and a third portion 108. The first portion 104 and the second portion 106 are mutually spaced away from one another with the third portion 108 interposed between the first and second portions 104, 106. The first portion 104, the second portion 106, and the third portion 108 are rigidly coupled to one another using a series of bolts 110.

Although the housing 102 is herein disclosed to consist of the first portion 104, the second portion 106, and the third portion 108 rigidly coupled to one another using bolts 110, such specific configuration of the housing 102 disclosed herein is merely exemplary in nature and hence, non-limiting of this disclosure. It will be appreciated that one skilled in the art may beneficially contemplate using housings of various other configurations known in the art to readily implement the embodiments of the present disclosure therein. For example, the torque converter 100 of the present disclosure can be optionally configured to have a single-piece housing i.e., a housing exhibiting a monolithic structure, or a dual-piece housing i.e., a housing having a first portion and an adjacently placed second portion that are rigidly coupled to one another to define a single parting line therebetween. Therefore, not withstanding anything contained in this document, it should be noted that the specific configuration of the housing 102 disclosed herein should be taken by way of example alone, and should not be construed as being limiting of the present disclosure.

As shown in FIG. 1, the torque converter 100 includes an input gear 112 for coupling to a prime mover such as, for e.g., an engine (not shown). The engine disclosed herein may be configured to power the machine by combustion of natural resources, such as gasoline, liquid natural gas, or other petroleum products. As such, the engine can be embodied as a petrol engine, a diesel engine, a dual-fuel engine or any other kind of engine utilizing combustion of fuel for generation of power. Alternatively, the prime mover can be embodied in the form of an electric motor (not shown). The torque converter 100 also includes a shaft 114 rigidly bearing a yoke 116 at one end 118 of the shaft 114. The yoke 116 and the shaft 114 can therefore connect with a transmission system (not shown) of the machine, for e.g., a continuously variable transmission (CVT), or an auto-transmission system of the machine.

Figure 2:
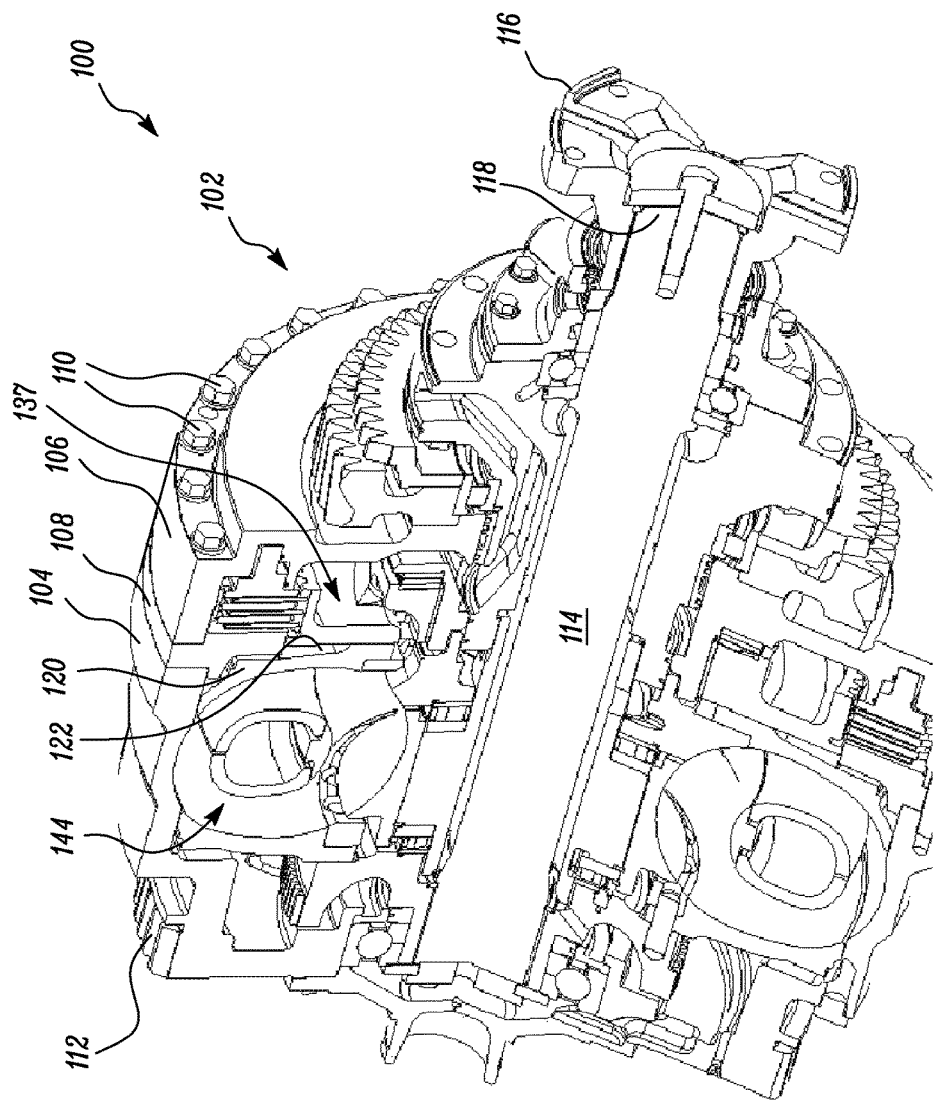
FIG. 2 is a sectional perspective view of the torque converter sectioned along section lines A-B and A-B', in accordance with embodiments of the present disclosure.
Figure 3:
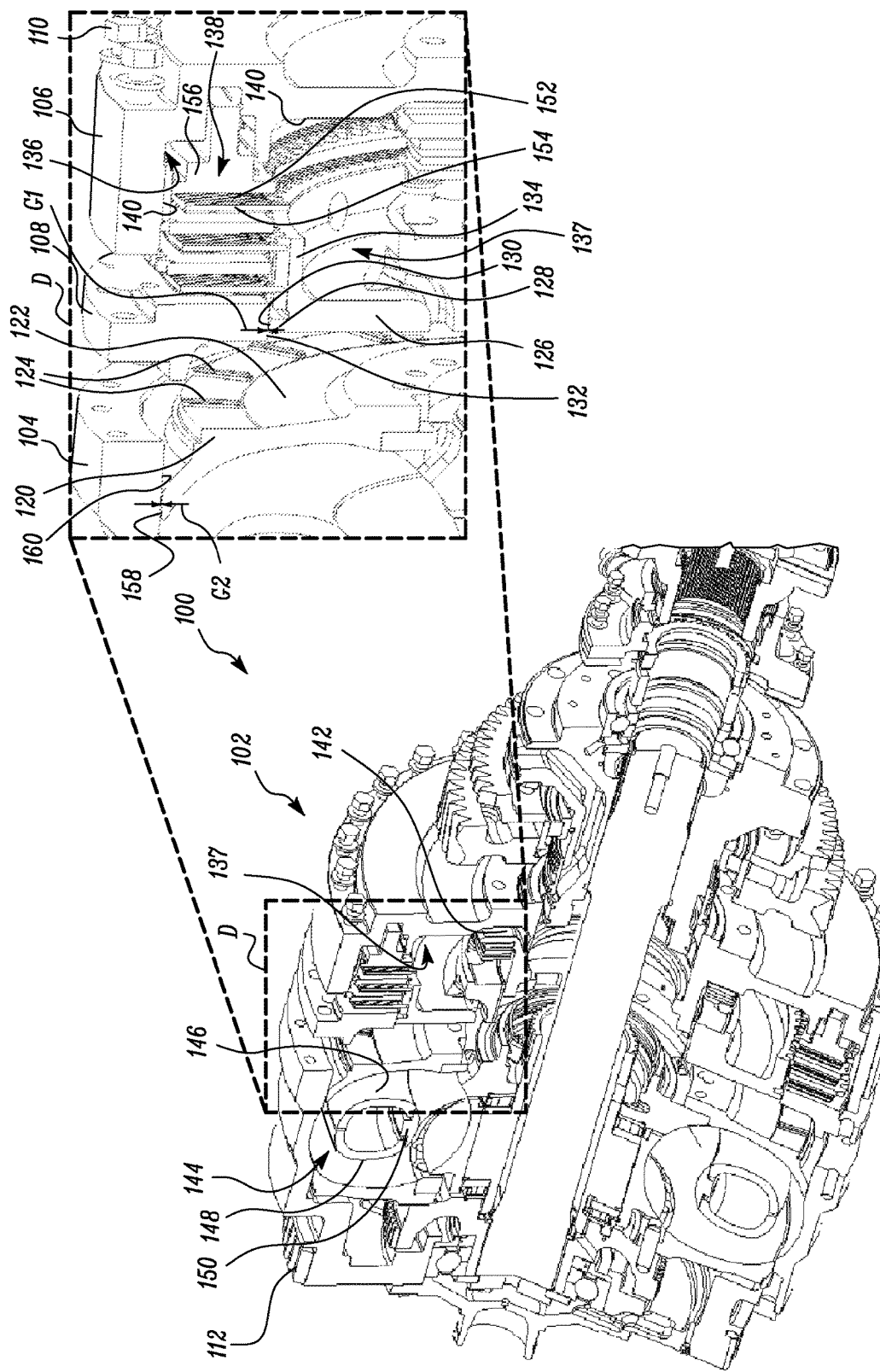
FIG. 3 is a perspective view of the torque converter from FIG. 2 in a partially exploded configuration showing an enlarged view of area D, in accordance with embodiments of the present disclosure.
Figure 4:
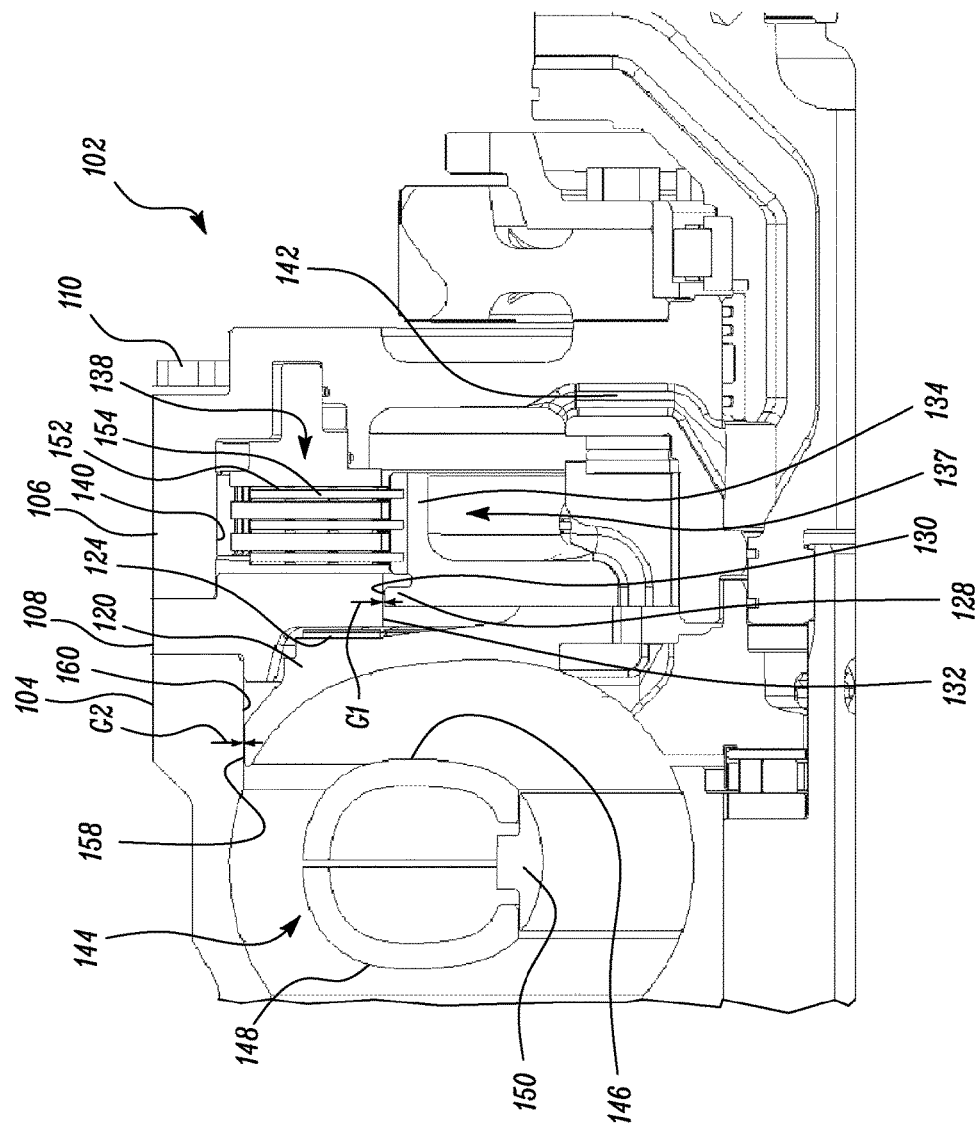
FIG. 4 is an orthogonal view of the area D from FIG. 3 in an assembled configuration.

Referring now to FIGS. 2-4, the torque converter 100 further includes an impeller shell 120. The first portion 104 of the housing 102 is disposed adjacent to the impeller shell 120. As such, the impeller shell 120 is disposed at least in part within the first portion 104 of the housing 102. The impeller shell 120 has a back wall 122, and a plurality of fins 124 radially arranged and extending outwardly from the back wall 122, as best shown in the enlarged view of FIG. 3.

The torque converter 100 further includes a backing hub 126 rigidly coupled to the back wall 122 of the impeller shell 120. The backing hub 126 includes a barrier element 128 extending outwardly from the backing hub 126 such that a free end 130 of the barrier element 128 is disposed proximal to an inner surface 132 of the third portion 108 of the housing 102. The free end 130 of the barrier element 128 and the inner surface 132 of the third portion 108 of the housing 102 are however, configured to mutually define a small gap G1 therebetween.

The backing hub 126 further includes a ledge member 134 laterally extending partway towards the second portion 106 of the housing 102. The ledge member 134, the second portion 106 of the housing 102, and the third portion 108 of the housing 102 are configured to mutually define a first outer pocket 136. The torque converter 100 further includes a clutch assembly 138 disposed in the first outer pocket 136. The clutch assembly 138 disclosed herein can be regarded as an impeller clutch for the purposes of the present disclosure.

In the illustrated embodiment of FIGS. 2-4, the ledge member 134 and an inner portion 140 of the second portion 106 of the housing 102 are configured to mutually define a second inner pocket 137 that is disposed inwardly with respect to the first outer pocket 136. The second inner pocket 137 is disposed in fluid communication with the first outer pocket 136. Moreover, in the illustrated embodiment of FIGS. 2-4, the second portion 106 of the housing 102 is configured to define a conduit 142 therethrough. The conduit 142 is disposed in fluid communication with the first inner pocket and the second outer pocket respectively.

Although it is disclosed herein that the conduit 142 is defined in the second portion 106 of the housing 102 alone, a location of the conduit 142 is merely exemplary in nature and hence, non-limiting of this disclosure. The conduit 142 disclosed herein can optionally be defined using other structures and/or components of the torque converter 100 as known to persons skilled in the art so as to be disposed in fluid communication with the first inner pocket and the second outer pocket.

During operation of the torque converter 100, the conduit 142 may route fluid (typically oil of a specific grade for a given application) into a torus 144 of the torque converter 100. For the purposes of the present disclosure, the torus 144 disclosed herein may be regarded as being inclusive of an impeller core 146, a turbine core 148, and a stator 150 that are relatively positioned in a configuration as shown in the illustrated embodiment of FIG. 2.

The clutch assembly 138 disclosed herein includes multiple friction discs 152 and corresponding steel discs 154 that are arranged to alternate with one another. Moreover, the clutch assembly 138 further includes a piston element 156 that can actuate the steel plates and the friction plates into engaging the prime mover for e.g., an engine (not shown) with the impeller core 146 during high-speed operation of the machine.

In various embodiments of the present disclosure, the bather element 128 is configured to maintain an increased mass flow rate of fluid to the clutch assembly 138. As the free end 130 of the barrier element 128 is disposed proximal to the inner surface 132 of the third portion 108 of the housing 102 and defines the small gap G1 therewith, fluid (oil) that is supplied from the conduit 142 moves into the second inner pocket 137 and is thereafter urged to flow into the first outer pocket 136 where the clutch assembly 138 is located. The barrier element 128 also helps to prevent this fluid from rapidly leaving the first outer pocket 136 and/or the second inner pocket 137 and from flowing towards the back wall 122 of the impeller shell 120.

Moreover, the fins 124 protruding radially from the back wall 122 of the impeller shell 120 are configured to operably increase backpressure to the fluid that is present between the backing hub 126 and the back wall 122 of the impeller shell 120. Therefore, these fins 124 can further assist the barrier element 128 in urging an increased amount of fluid to flow from the conduit 142 to the first outer pocket 136 in which the clutch assembly 138 is located.

During operation of the torque converter 100, fluid from the conduit 142 may enter the second inner pocket 137 and the first outer pocket 136 respectively. While the gap G1 offers resistance to the flow of fluid from the first outer pocket 136 and/or the second inner pocket 137 towards the back wall 122 of the impeller shell 120, the fins 124 further increase the resistance to the flow of fluid from the first outer pocket 136 and/or the second inner pocket 137 towards the back wall 122 of the impeller shell 120 by operably increasing the backpressure to the fluid that is already present between the backing hub 126 and the back wall 122 of the impeller shell 120. This consequently causes the fluid supplied by the conduit 142 to flow from the second inner pocket 137 to the first outer pocket 136 with less resistance. This decreased resistance to the flow of fluid can therefore help the fluid from the second inner pocket 137 to easily flow towards the clutch assembly 138 present in the first outer pocket 136 and accomplish lubrication and cooling functions on the clutch assembly 138.

Therefore, in various embodiments disclosed herein, it is hereby envisioned that with a restricted rate of flow of the fluid from the pockets 136, 137 towards the back wall 122 of the impeller shell 120, the fluid is urged to bypass the barrier element 128 and hence, move easily from the second inner pocket 137 into the first outer pocket 136 where the clutch assembly 138 is located. This easy and/or increased fluid flow from the second inner pocket 137 to the first outer pocket 136 can therefore help in lubricating and cooling down the clutch assembly 138 during an operation of the torque converter 100. Consequently, rapid wear and tear at the clutch assembly 138 may be prevented and the service life of the clutch assembly 138 may be prolonged to its rated service life.

Various embodiments disclosed herein are to be taken in the illustrative and explanatory sense, and should in no way be construed as limiting of the present disclosure. All joinder references (e.g., attached, affixed, coupled, engaged, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 5:
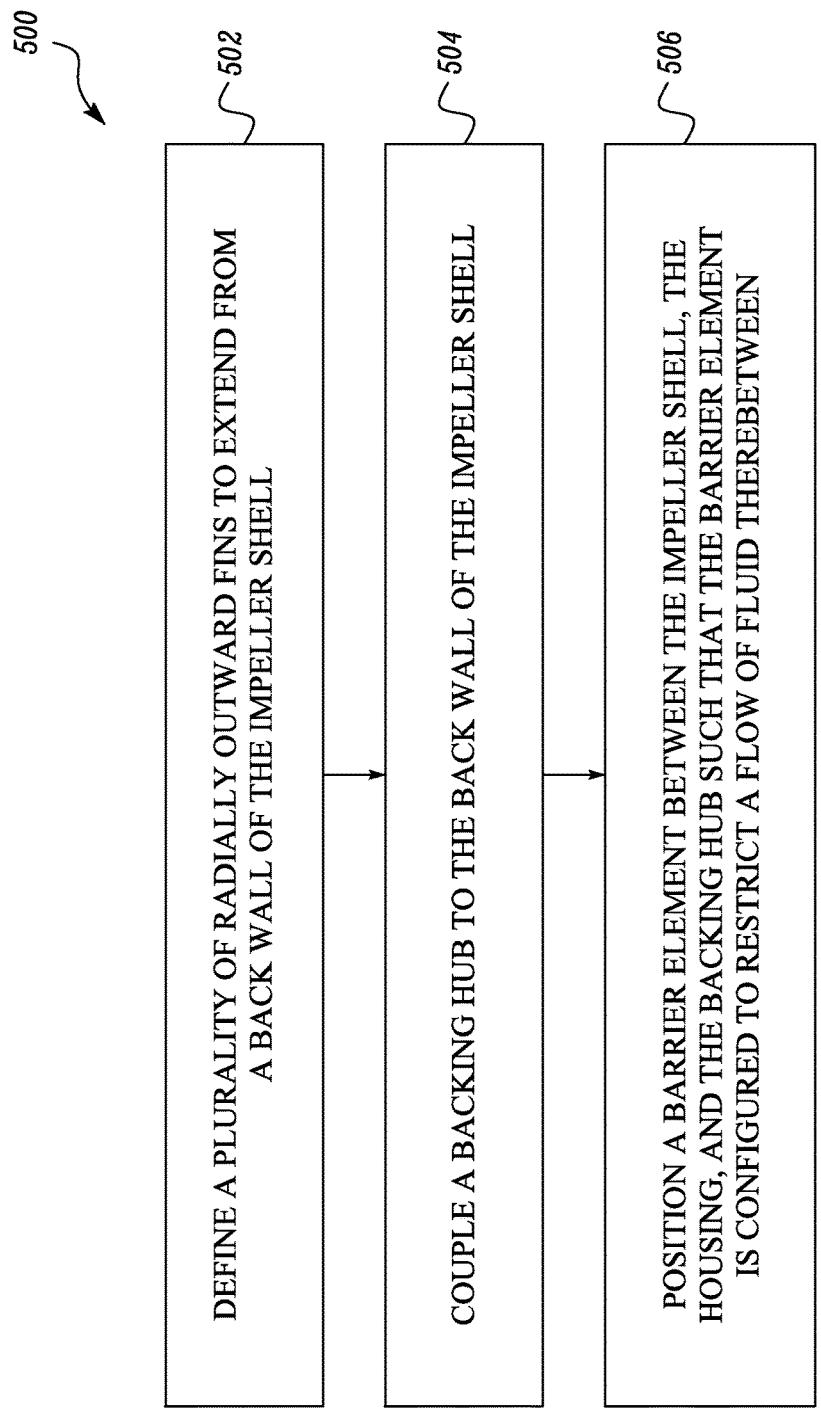
FIG. 5 is a method for cooling a clutch assembly of the torque converter, in accordance with embodiments of the present disclosure.

FIG. 5 illustrates a method 500 for cooling the clutch assembly 138 of the torque converter 100, in accordance with embodiments of the present disclosure. At step 502, the method 500 includes defining multiple radially outward fins 124 to extend from the back wall 122 of the impeller shell 120. As disclosed in an embodiment earlier herein, these radially outward fins 124 are configured to operably increase backpressure to the flow of fluid between the bather element 128 and the inner surface of the housing 102.

At step 504, the method 500 further includes coupling the backing hub 126 to the back wall 122 of the impeller shell 120. In this embodiment, the method 500 also includes defining the first outer pocket between the backing hub 126 and the housing 102 for positioning the clutch assembly 138 within the first outer pocket.

At step 506, the method 500 further includes positioning the bather element 128 between the impeller shell 120, the housing 102, and the backing hub 126 such that the bather element 128 is configured to restrict a flow of fluid therebetween. As disclosed earlier in an embodiment herein, the free end 130 of the barrier element 128 is disposed proximal to the inner surface 132 of the third portion 108 of the housing 102 so that the barrier element 128 is configured to maintain an increased mass flow rate of fluid to the clutch assembly 138 that is disposed within the first outer pocket.

Optionally or additionally, in an embodiment of the present disclosure, the method 500 may further include selecting a size of the impeller shell 120 such that a gap G2 defined between a circumferential surface 158 of the impeller shell 120 and an inner surface 160 of the first portion 104 of the housing 102 is optimized to further control a rate of flow of the fluid flowing from the back wall 122 of the impeller shell 120 to the torus 144. This optimization of control in the rate of flow of fluid flowing from the back wall 122 of the impeller shell 120 to the torus 144 can further enhance retention of the fluid at the first outer pocket 136 and the second inner pocket 137 thereby ensuring that sufficient volume of fluid is present at the clutch assembly 138 for the cooling and lubrication of the clutch assembly 138.

Embodiments of the present disclosure have applicability for use and implementation in cooling and lubricating a clutch assembly of a torque converter. When implemented in a torque converter, embodiments of the present disclosure can help protect the associated clutch assembly from overheating during operation and prevent the clutch assembly from being subject to a rapid rate of wear and tear. Additionally, embodiments of the present disclosure can help manufacturers and service personnel to offset time, costs, and effort previously incurred with frequent replacement of worn out clutch assemblies of torque converters.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A torque converter comprising:
   a housing;
   an impeller shell disposed within the housing, the impeller shell having an impeller core positioned inwardly from the impeller shell and a back wall positioned opposite the impeller core, and a plurality of fins radially arranged and extending outwardly from the back wall; and
   a backing hub rigidly coupled to the back wall of the impeller shell, the backing hub having a barrier element extending therefrom, wherein a free end of the barrier element is disposed proximal to the housing to restrict a flow of fluid therebetween.

2. The torque converter of claim 1, wherein the housing comprises:
   a first portion disposed adjacent to the impeller shell;
   a second portion spaced apart from the first portion; and
   a third portion disposed between and rigidly coupled to the first and second portions.

3. The torque converter of claim 2, wherein the free end of the barrier element is disposed proximal to an inner surface of the third portion of the housing.

4. The torque converter of claim 3, wherein the plurality of fins are configured to operably increase backpressure to the flow of fluid between the free end of the barrier element and the inner surface of the third portion of the housing.

5. The torque converter of claim 2, wherein the backing hub further comprises a ledge member laterally extending partway towards the second portion of the housing.

6. The torque converter of claim 5, wherein the barrier element, the ledge member, the second portion of housing, and the third portion of the housing are configured to mutually define a first outer pocket therebetween.

7. The torque converter of claim 6 further comprising a clutch assembly disposed in the first outer pocket.

8. The torque converter of claim 6, wherein the ledge member and an inner portion of the second portion of the housing are configured to mutually define a second inner pocket disposed inwardly with respect to the first outer pocket.

9. The torque converter of claim 8, wherein the first outer pocket is disposed in fluid communication with the second outer pocket.

10. The torque converter of claim 8, wherein the second portion of the housing is configured to define a conduit therethrough, the conduit disposed in fluid communication with the first outer pocket and the second inner pocket respectively.

11. A torque converter comprising:
    a housing comprising:
    a first portion disposed adjacent to an impeller shell, the impeller shell being disposed at least in part within the first portion of the housing, wherein the impeller shell having an impeller core positioned inwardly from the impeller shell and has a back wall positioned opposite the impeller core, and a plurality of fins radially arranged and extending outwardly from the back wall;
    a second portion spaced apart from the first portion; and
    a third portion disposed between and rigidly coupled to the first and second portions; and
    a backing hub rigidly coupled to the back wall of the impeller shell, the backing hub comprising:
    a barrier element extending outwardly from the backing hub such that a free end of the barrier element is disposed proximal to an inner surface of the third portion of the housing; and
    a ledge member laterally extending partway towards the second portion of the housing, wherein the ledge member, the second portion of the housing, and the third portion of the housing are configured to mutually define a first outer pocket; and
    a clutch assembly disposed in the first outer pocket, wherein the barrier element is configured to maintain an increased mass flow rate of fluid to the clutch assembly.

12. The torque converter of claim 11, wherein the plurality of fins are configured to operably increase a backpressure to the flow of fluid between the free end of the barrier element and the inner surface of the third portion of the housing.

13. The torque converter of claim 11, wherein the ledge member and an inner portion of the second portion of the housing are configured to mutually define a second inner pocket that is disposed inwardly with respect to the first outer pocket.

14. The torque converter of claim 13, wherein the first outer pocket is disposed in fluid communication with the second outer pocket.

15. The torque converter of claim 13, wherein the second portion of the housing is configured to define a conduit therethrough, the conduit disposed in fluid communication with the first outer pocket and the second inner pocket respectively.

16. A method for cooling a clutch assembly of a torque converter having a housing and an impeller shell, the impeller shell having an impeller core positioned inwardly from the impeller shell and a back wall positioned opposite the impeller core, the impeller shell disposed within the housing, the method comprising:
    defining a plurality of radially outward fins to extend from the back wall, opposite the impeller core, of the impeller shell;
    coupling a backing hub to the back wall of the impeller shell; and
    positioning a barrier element between the impeller shell, the housing, and the backing hub such that the barrier element is configured to restrict a flow of fluid therebetween.

17. The method of claim 16 further comprising defining a first outer pocket between the backing hub and the housing.

18. The method of claim 16 further comprising positioning the clutch assembly within the first outer pocket.

19. The method of claim 17, wherein the barrier element is configured to maintain an increased mass flow rate of fluid to the clutch assembly disposed within the first outer pocket.

20. The method of claim 16, wherein the plurality of radially outward fins are configured to operably increase a backpressure to the flow of fluid between the barrier element and an inner surface of the housing.

* * * * *